Jan. 9, 1945. T. G. LE CLAIR 2,366,913
AUTOMATIC PRINTING AND TOTALIZING METERING SYSTEM
Filed Jan. 3, 1941 11 Sheets-Sheet 1

Fig. 1.

Inventor:
Titus G. Le Clair.
By Brown, Jackson, Boettcher & Dienner
Attys.

Jan. 9, 1945.  T. G. LE CLAIR  2,366,913
AUTOMATIC PRINTING AND TOTALIZING METERING SYSTEM
Filed Jan. 3, 1941  11 Sheets-Sheet 4
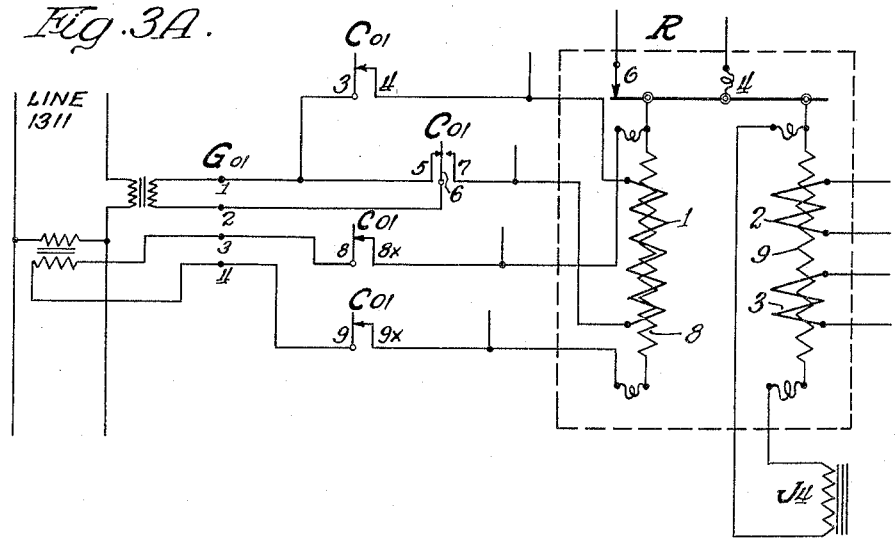
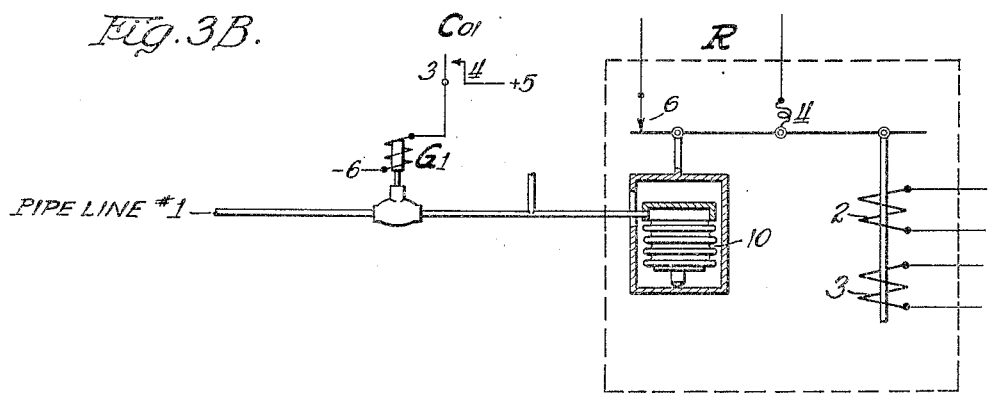
Inventor:
Titus G. LeClair Jan. 9, 1945.　　　T. G. LE CLAIR　　　2,366,913
AUTOMATIC PRINTING AND TOTALIZING METERING SYSTEM
Filed Jan. 3, 1941　　11 Sheets-Sheet 5

Inventor:
Titus G. LeClair.
By
Brown, Jackson, Boettcher & Dienner
Attys

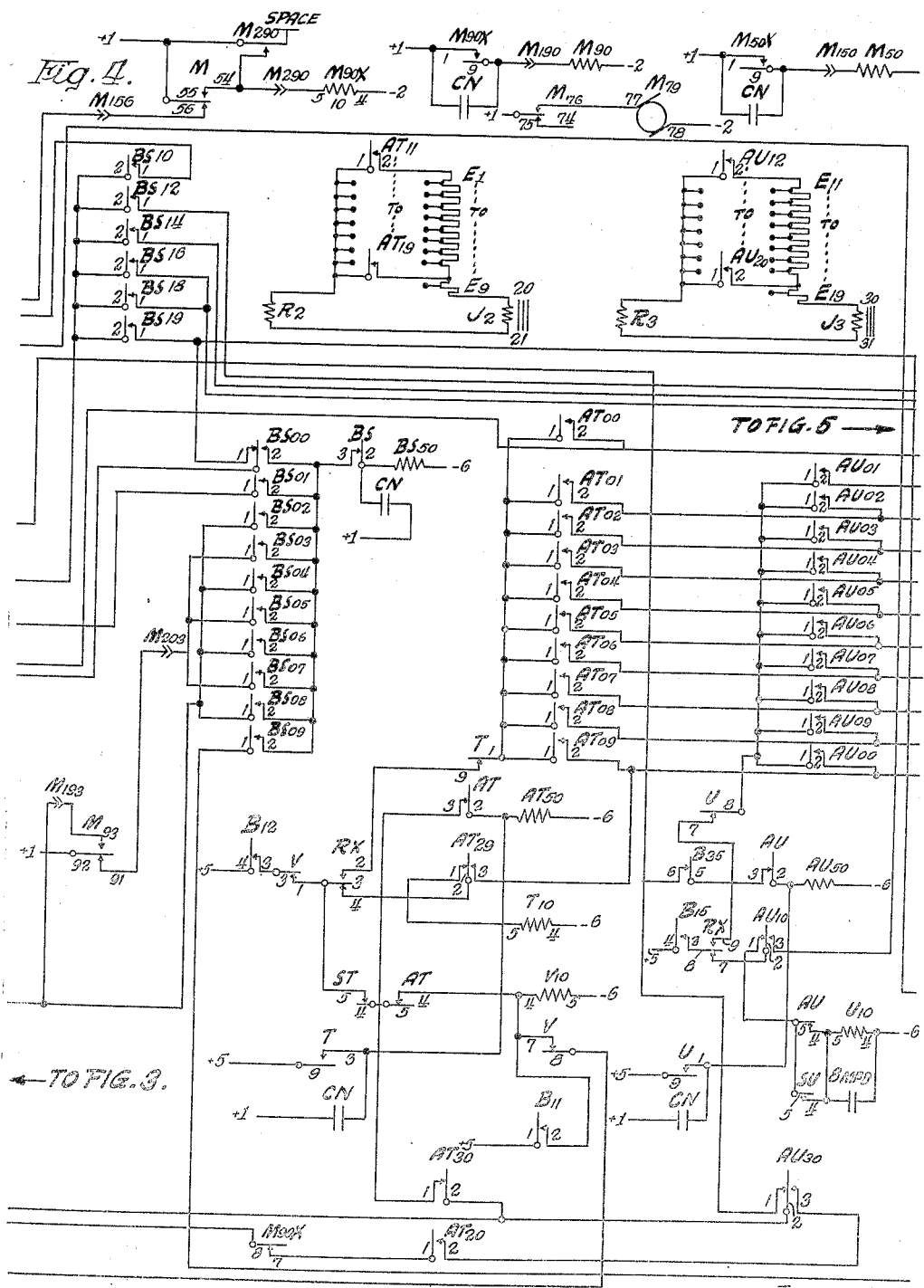

Jan. 9, 1945. T. G. LE CLAIR 2,366,913
AUTOMATIC PRINTING AND TOTALIZING METERING SYSTEM
Filed Jan. 3, 1941 11 Sheets-Sheet 7

Inventor:
Titus G. LeClair.
By Brown, Jackson, Boettcher & Dienner
Attys.

Jan. 9, 1945.   T. G. LE CLAIR   2,366,913
AUTOMATIC PRINTING AND TOTALIZING METERING SYSTEM
Filed Jan. 3, 1941   11 Sheets-Sheet 10

(CIRCUIT SELECTOR SWITCH)

(BALANCING RELAY)

Inventor:
Titus G. Le Clair.
By Brown Jackson Boettcher Dienner
Attys.

Jan. 9, 1945. T. G. LE CLAIR 2,366,913
AUTOMATIC PRINTING AND TOTALIZING METERING SYSTEM
Filed Jan. 3, 1941 11 Sheets-Sheet 11

(TOTALIZING SEQUENCE SWITCH)

Inventor:
Titus G. LeClair

Patented Jan. 9, 1945

2,366,913

UNITED STATES PATENT OFFICE 2,366,913

AUTOMATIC PRINTING AND TOTALIZING METERING SYSTEM

Titus G. Le Clair, Chicago, Ill.

Application January 3, 1941, Serial No. 373,013

21 Claims. (Cl. 234—5.5)

The present invention relates to automatic printing and totalizing metering systems, and embodies improvements upon the automatic printing metering system disclosed in my prior application, Serial No. 201,787, filed April 13, 1938, Patent No. 2,313,752, March 16, 1943. In several respects, the present application is a continuation-in-part of my prior application.

Systems of this type are particularly adapted for determining and recording one or more of the load characteristics of generating station and substation transmission lines, although the invention can also be employed for measuring and recording the characteristics of other electrical circuits, power systems and different forms of apparatus.

In large power stations it is common practice to note and record the ammeter readings on all outgoing transmission lines at frequent intervals. These recorded ammeter readings are used to determine the nature of the load curve on the transmission lines for planning purposes. It is also quite common practice to have the network so arranged that the substations fed from a given generating station may be interconnected or grouped, and it is, therefore, desirable to totalize the loads in the lines feeding a given group.

Substations may frequently be of the supervisory control or automatic type. In such a station, it is desirable to obtain complete and continuous records of the loadings on the transformers and on the distribution feeders which radiate from the substation.

If plans for additional transmission line or feeder capacity are to be made accurately, they should be based on load records which are reasonably complete and accurate within the limits of estimating error for future loads.

The systems forming the subject matter of this application and of my aforementioned prior application perform the above operations of measuring and recording the load values automatically. These operations are made to occur automatically at regular time intervals, such as every thirty minutes, although other time programs may be employed, or the operation of the system may be initiated upon the establishment of predetermined conditions or through other controls.

The system of the present application distinguishes from the system of my earlier application in providing an improved arrangement of totalizing apparatus. This reduces much of the computation heretofore necessary and greatly increases the facility and range of use of the log sheet on which the load values are recorded. It is of particular value when recording the load values of a large number of circuits which are not grouped in numerical sequence on the log sheet. For example, let us assume a typical station having approximately forty-five outgoing transmission lines, wherein the indicating meters are arranged in the same order on the switchboard as are the line switches on the buses in the station. The columns on the log sheet are designated to identify the circuits, and the operator arranges these columns or the designation thereof on the log sheet in the same order as the indicating meters or line switches so as to avoid error. Furthermore, we shall assume that the forty-five transmission lines are divided into ten different groups. The lines to a given group of load are not on adjacent switch positions, but are scattered throughout the station in order to diversify the supply to the load. Heretofore, in the absence of automatic totalizing apparatus in such a situation, it has been necessary for the planning engineer to look at scattered columns on the log sheet in order to totalize the loads in each group. Much error frequently arises from the personal equation in noting, adding, and recording these values. The totalizing operation is necessary because the load division in lines changes from hour to hour, and the maximum load reading on a given line does not necessarily determine the time of day for the maximum load on the group. Therefore, in devising the later form of recording apparatus herein disclosed, I have included an improved totalizing mechanism which records the total of the loads on the lines of each group in addition to the individual line loads.

Another feature of the new system herein disclosed is an increased flexibility so that it is a relatively simple matter to change the order in which the meter readings appear on the log sheet, or to change the groups of readings included in a given total. This is accomplished by the use of a plugging board arranged so that the secondary current circuits of transmission lines may be connected to the present meter in any order or grouping desired without changing any of the permanent wiring in the meter. This is very convenient as new transmission lines are installed, or lines are cut over from one substation group to another at intervals of a few months.

Another feature of the new system herein disclosed is an improved arrangement wherein the relative shifting motion between the log sheet and the printing means is effected by shifting the printing means laterally across the width of the log sheet, instead of shifting the log sheet relatively to the printing means. The printing means is preferably in the form of a type wheel which is rotated to different angular positions to present different type faces, and which is shifted laterally across the width of the log sheet in shifting from column to column. By shifting the type wheel instead of the log sheet, a much wider sheet can be used, the entire assembly is made of more compact dimensions, and the printer can handle a greater number of transmission lines.

Another feature of the invention resides in an improved manner of measuring, recording and totalizing the different values based upon a unique method of splitting or dividing the values into different components, such as units, tens and hundreds; and also in an improved sequence in which these components are measured and recorded. For example, the operation of measuring and recording the hundreds or tens of amperes is performed as one step, and the operation of measuring and recording the tens or units of amperes is performed as another step, preferably later in the sequence.

Other features, objects and advantages of the invention will appear from the following detail description of certain preferred embodiments thereof. In the accompanying drawings illustrating such embodiments:

Figure 1 is a fragmentary view showing the connected log sheets which make up the continuous record strip on which all of the individual load circuit readings and the totalized readings are recorded;

Figures 3, 4 and 5 are connected portions of a schematic circuit diagram of the invention;

Figure 3A is a fragmentary diagram, adapted for substitution in a portion of Figure 3, for the purpose of illustrating a modified embodiment of the invention;

Figure 3B is a similar diagram illustrating a further modified embodiment; and

In Figure 1 I have illustrated a typical log sheet or record strip such as is produced by the present invention. The record strip comprises a plurality of log sheets 200 connected together end to end, with a line of perforations between adjacent sheets for tearing them apart. Each log sheet is divided into columns and rows, with appropriate circuit and totalizing designations for the columns, and with appropriate time designations for the rows. The column position of a given reading on the log sheet signifies the circuit from which the reading was taken. To facilitate the use of the log sheet for load computation, the readings of one group of circuits will usually be grouped in one location on the log sheet, the readings of another group of circuits will usually be grouped in another location on the log sheet, etc.

The totals of these different groups of readings are printed in totalizing columns at the end of each group of circuits. The row position of each reading on the log sheet signifies the time when the reading was taken. For example, the readings are preferably taken at regular 30 minute intervals, and the log sheets as supplied to the mechanism have these 30 minute intervals permanently printed thereon. Each log sheet is also provided with a space at the top for the date or other notation, and space is further provided at the bottom for the making of appropriate observations, operating notations and the like following the completion of the printing cycle for that particular day. The entire strip of log sheets may be of considerable length, arranged in a row or stack, and supported in any suitable manner adjacent to the printing mechanism for feeding thereto the successive log sheets with each day's operation. If desired, several copies of the record may be obtained by the use of successive log strips with interposed strips of carbon paper therebetween.

Figure 2:
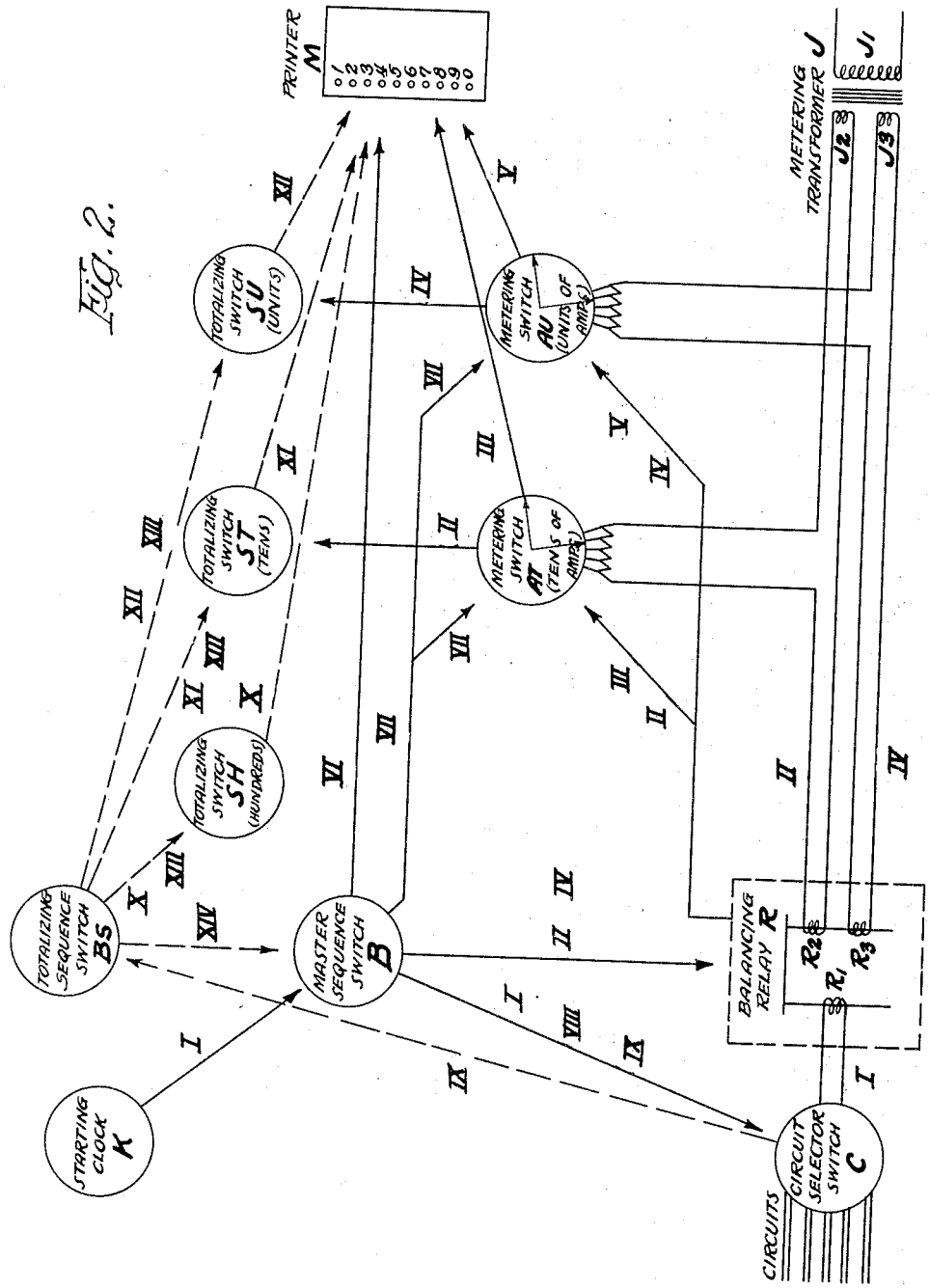
Figure 2 is a block diagram showing each major element of the apparatus in relation to its place in the sequence of operations rather than in its physical position, this diagram being used in connection with a preliminary outline description of the invention.

Figure 2 is a block diagram which shows each major element of the apparatus in relation to its place in the sequence of operations rather than in its physical position. A brief preliminary description of the major elements of the apparatus, and of their sequence of operation, based on this block diagram of Figure 2, will greatly simplify the understanding of the more elaborate circuit diagram of Figures 3, 4 and 5, and the more detailed description of that circuit diagram hereinafter appended. In Figure 2, each of the major elements is merely symbolized by a circle or rectangle, and the several elements are interconnected by arrows indicating the sequence of operation. The Roman numerals alongside these arrows designate the sequence of the steps in the complete cyclical operation of the system.

A contact-making clock K is used to start the sequence of operations to obtain the readings. This contact-making clock may be either a simple device making contact every 15, 30 or 60 minutes, or it may be set up with a definite program to take readings at variable intervals.

The master sequence switch B is a rotary control switch used to determine the order in which the various functions of the meter are performed. Each step in the process of taking meter readings is controlled by this master sequence switch B.

The circuit selector switch C is a 50 point rotary switch, with each of the circuits which are to be measured connected to one of the points or positions. A common connection leads from this switch to the measuring part of the equipment. Each load circuit to be measured is normally short-circuited on itself in this selector switch C but not connected to any other circuit. The circuit selector switch C is used to connect the successive load circuits in turn to the remainder of the equipment.

The balancing relay R has two cores pulling at opposite ends of a balancing beam. The coil R1 on one core of this relay is connected in turn to each circuit to be measured, this operation being performed by the circuit selector switch C. The current in this coil R1 is the current flowing in the circuit being measured. The other core of the relay has two coils R2 and R3. Each of these latter coils is supplied with a variable current which is adjusted until the relay comes to a balance.

The metering transformer J is connected to a constant voltage A.-C. source, and has two secondary windings J2 and J3 to supply current to the two coils R2 and R3 on the right hand core of the balancing relay R through metering switches AT and AU.

The tens metering switch AT is a rotary switch used to select steps on a resistor which is interposed in the circuit from the secondary J2 of the metering transformer J to the coil R2 of the balancing relay R. Each step taken by this metering switch AT increases the current in the coil R2 of the balancing relay R by 10 amperes. Separate contacts of this metering switch are connected to corresponding solenoid stops in the printing mechanism M to select figures corresponding to the tens of amperes in the circuit.

The units metering switch AU is similar to the tens metering switch AT except that each step that this unit metering switch takes, varies the current in its corresponding coil R3 of the balancing relay R by one ampere instead of ten amperes. Separate contacts in this rotary switch AU are also connected to the solenoid stops in the printing mechanism M.

The totalizing sequence switch BS is similar to the master sequence switch C except that it controls the order of procedure for the printing of totals only.

Three totalizing rotary switches SU, ST and SH are used. The switch SU is used for totalizing units, the switch ST is used for totalizing tens, and the switch SH is used for totalizing hundreds of amperes. Their method of operation is similar to that of an ordinary odometer. Each totalizing switch has contacts connected to the points in the printing mechanism M to select the correct figures to be printed.

The printer comprises primarily a small type wheel which has numerals engraved on its periphery. This type wheel is caused to rotate after the meter has struck a balance. Solenoid stops are used to position the type wheel so that the proper number is opposite the log sheet. The type wheel is then forcibly pressed against the paper, following which the carriage of the type wheel is shifted to the right one space, ready for the next printing operation. A number of control buttons are mounted on a panel in front of the printer. These buttons allow the operator to type line numbers at the top of the log sheet. There are also buttons for other manual control operations.

As previously remarked, a brief description of the sequence of operations based on this block diagram of Figure 2 will facilitate complete understanding of the more elaborate circuit diagram and description to be taken up later. The Roman numerals in parentheses in Figure 2 designate the successive steps in the order in which they are described in the following paragraphs, correspondingly identified.

It will be assumed that the apparatus is in its normal condition, with all circuits dead and all rotary switches in their normal or home positions.

(I) The contact-making clock K closes its contacts to start the taking of a reading. Through the operation of this clock K and the master sequence switch B, the circuit selector switch C connects the first load circuit to be measured with the coil R1 of the balancing relay R. The units metering switch AU normally stands in a position which supplies nine amperes in the coil R3 of the balancing relay R so that, if the current in the circuit to be measured is less than nine amperes, the balancing relay R will trip. However, if the current in the circuit to be measured is greater than nine amperes, this does not happen.

(II) The master sequence switch B, through the balancing relay R, next starts the tens metering switch AT to advancing. Each step that this switch AT takes, increases the current in the corresponding coil R2 of the balancing relay R by ten amperes, so that the corresponding total pull on this side of the relay is successively nine amperes, nineteen amperes, twenty-nine amperes, etc., until the balancing relay R trips. For example, let us assume that the current to be measured in the load circuit then connected to the apparatus is thirty-six amperes. In this case, the relay trips in the third position when the pull of thirty-nine amperes overcomes the pull of thirty-six amperes. The tens totalizing switch ST is driven synchronously with the tens metering switch AT, but no connection is made from the totalizing switch ST to the printer M at this time.

(III) The tripping of the balancing relay R completes a circuit through the second group of contacts on the tens metering switch AT to select the correct solenoid stop on the printing mechanism M to print on the log sheet the number corresponding to the tens of amperes measured (which, in the example referred to, is the numeral 3).

(IV) The master sequence switch B transfers the operation to the units metering switch AU. This units metering switch is first placed in the position of zero current in the units coil R3 of the balancing relay so that said relay then has a total current in the righthand coil less than that in the circuit being measured (i. e., at this instant in the example referred to, the current in the right hand coil would be 30 amperes). The units metering switch AU then advances, increasing the current in its corresponding coil R3 one ampere at each step until the balancing relay R again trips. The units totalizing switch SU also operates synchronously with the units metering switch AU but does not operate the printer M.

(V) The tripping of the balance relay R then selects, through the separate contacts of the units metering switch AU, the correct solenoid stop on the printing mechanism M to print the figure corresponding to the units of amperes measured (which, in the example given, would be the numeral 6).

(VI) Following this, the master sequence switch B operates the printer M, to space the carriage ready for the next reading.

(VII) The master sequence switch B next restores the tens and units metering switches AT and AU to their home positions. However, the totalizing rotary switches are not restored to their home positions at this time, but remain as set by the first reading.

The steps thus far described complete the cycle of operation for taking and printing the meter readings for one circuit.

(VIII) The master sequence switch B next advances the circuit selector switch C one step in order to disconnect from the balancing relay R the above described first-measured circuit, and to connect to the balancing relay the second circuit to be measured. The operation of measuring and printing is repeated for this second circuit in exactly the same general manner as described above for the first circuit. The circuit selector switch C is equipped with separate contacts by means of which a totalized reading can be taken or printed immediately upon completing the meter reading of any selected or predetermined load circuit. For example, it may be assumed that a totalized reading is to be taken or printed of the first four readings. In such case, the fourth meter reading is taken according to the same procedure as described above, but the master sequence switch B does not complete its rotation.

(IX) Through the auxiliary contact in the fourth position of the circuit selector switch C, the master sequence switch B transfers control to the totalizing sequence switch BS.

(X) The totalizing sequence switch BS then connects the hundreds totalizing switch SH to the printer M, which prints the number corresponding to the position of switch SH.

(XI) The totalizing sequence switch BS then connects the tens totalizing switch ST to the printer M, which prints the number corresponding to the position of switch ST.

(XII) The totalizing sequence switch BS then connects the units totalizing switch SU to the printer M, which prints the number corresponding to the position of switch SU. The above above three operations serve to record a three digit numeral which corresponds to the total of the figures printed for the first four meter readings.

(XIII) The totalizing sequence switch BS then returns the three totalizing switches SH, ST, and SU back to their normal or home positions, and (XIV) The totalizing sequence switch BS transfers control back to the master sequence switch B to complete its travel and go on with the next reading.

Figure 3:
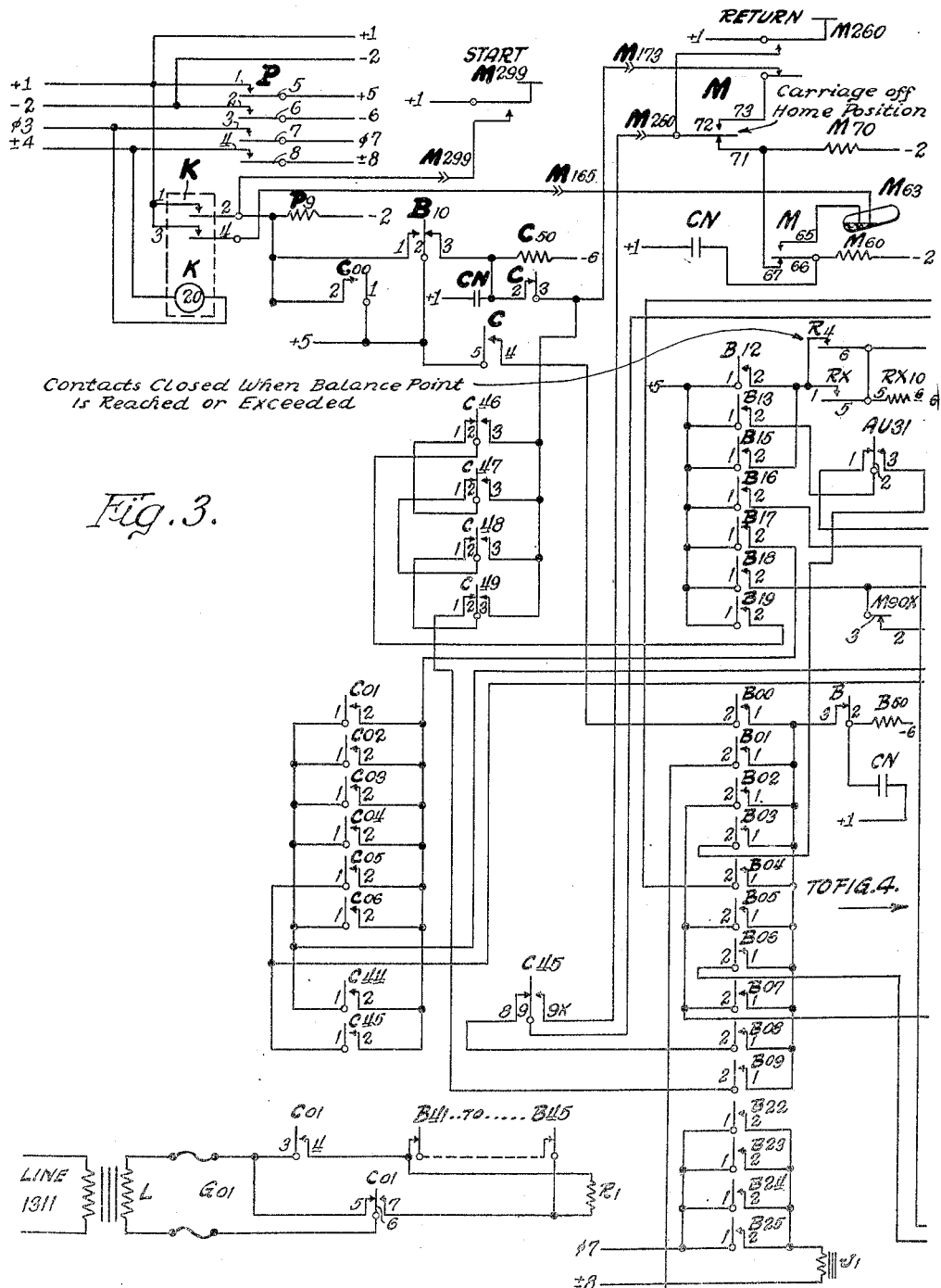
Figure 4C:
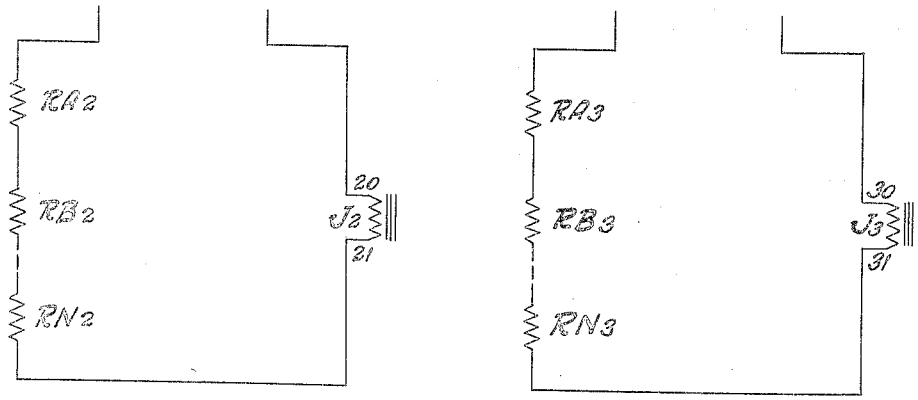
Figure 5:
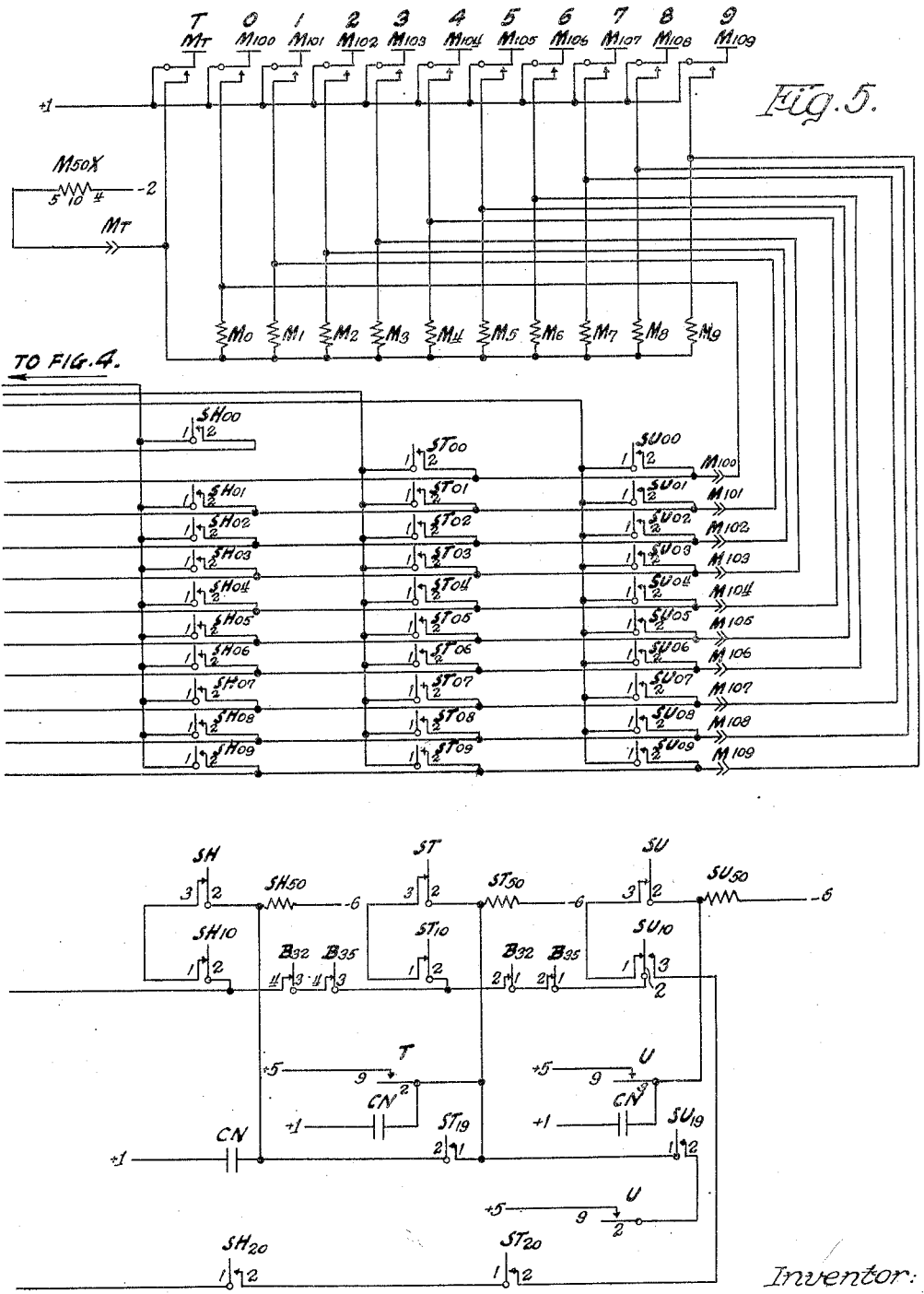

Attention is now directed to the schematic diagram of Figures 3, 4 and 5 for a more detailed explanation of the system. In numbering the parts in these latter figures, the following numbering system will be used: The first letter or letters will identify the rotary switch, relay or other main unit of the system, such as the rotary switch B or the rotary switch AT, or the balancing relay R, etc. When only one or two numerals follow such letter or letters these numerals will designate certain physical parts of the particular unit identified by the letters. For example "B01" will designate the group or pile-up of contacts 01 of the rotary switch B; "AT50" will designate the stepping mechanism 50 of rotary switch AT; "R6" will designate the contacts 6 of balancing relay R, etc. When three or more numerals follow the primary designating letter or letters, the first two numerals will designate a position of some movable element of the main unit, and the next numeral or numerals will designate contacts or other parts actuated by or responsive to that position. Thus, "B1023" will represent an arm on switch B in position 10 making contacts 2 and 3 in that position.

Referring now to the sources of current supply for effecting the operation of the system, these are indicated conventionally in Figure 3 by a direct current source of supply +1 and −2, and by an alternating current source of supply φ3 and ±4, these supply circuits being separate and apart from the load circuits which are to be measured by the apparatus. The supply circuit +1 and −2, is preferably a direct current circuit wherein conductor +1 is of positive polarity and conductor −2 is of negative polarity, although it is to be understood that the use of direct current in this supply circuit is not essential. The other supply circuit φ3 and ±4 is an alternating current circuit preferably having a standard voltage, such as approximately 110 to 120 volts, and has the same frequency as the frequency in the load circuits which are to be measured, such being ordinarily 60 cycles.

Referring again to the contact-making clock K as illustrated in Figure 3, this clock is driven by a synchronous motor or other time responsive mechanism K20, and has two sets of time-controlled contacts K1—K2 and K3—K4. The contacts K1—K2 are closed at 30 minute intervals by the clock to start each set of readings, and the contacts K3—K4 are closed once in 24 hours to insert or bring into printing position the new log sheet for the new day's readings.

The power-supply contactor P is used to open and close the power supply circuit for all of the metering equipment except the contact-making clock K and the printing mechanism M. The contacts 1—5, 2—6, 3—7 and 4—8 are closed whenever the coil P9 of the contactor P is energized, and remain closed so long as that coil is energized.

Figure 6:
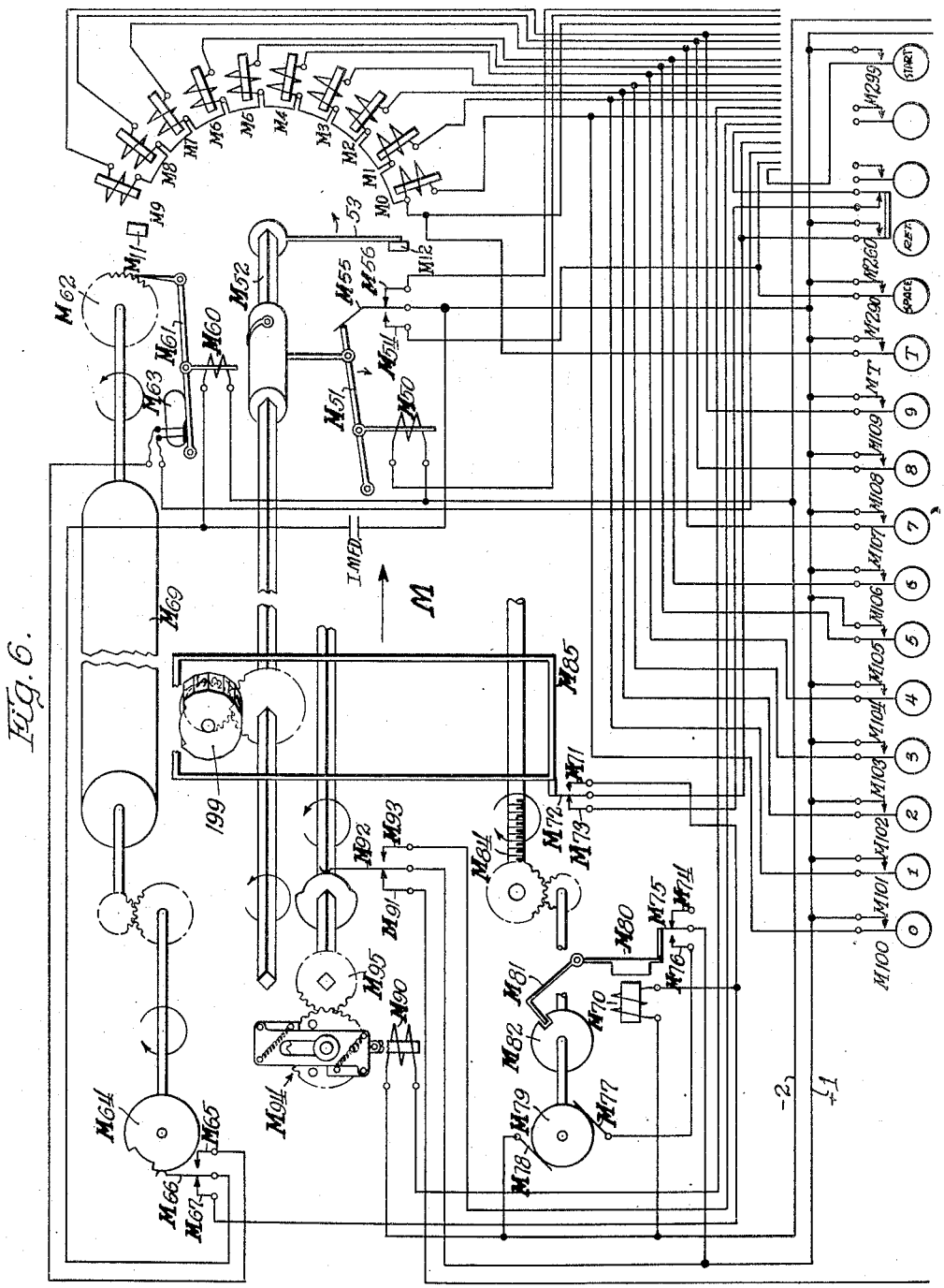
Figure 6 is a diagrammatic view of the printing mechanism.

The printing mechanism M is shown in diagrammatic form in Figure 6, and is also included in the schematic circuit diagram of Figures 3, 4 and 5. For a complete disclosure of this printing mechanism in all its details, attention is directed to the copending application of Titus G. LeClair, James R. Harrington and Boyd H. Smith, Serial No. 373,158, filed January 4, 1941, on "Printing mechanism." Referring to the diagrammatic illustration of this printing mechanism in present Figure 6, the device comprises a printing wheel 199 suitably engraved with printing numerals, this wheel being driven by shaft M52. This shaft, in turn, is caused to rotate by the lever arrangement M51 when coil M50 is energized, and at the proper time it is again returned to its original position by a spring (not shown). The rotation of shaft M52 is stopped when arm M53 strikes any one of the stops M0, M1, M2, etc. When any one of the coils associated with these stops M0 to M9 is energized, the corresponding stop is projected inwardly to lie in the path of the arm M53.

The engraved printing wheel is impelled against the paper record sheet by a rack or gear sector M94 which actuates shaft M95 when coil M90 is energized, such motion of shaft M95 impelling the printing wheel against the paper record. The wheel is returned to its normal position by a suitable spring (not shown) following each printing operation. The forward rotation of shaft M95 not only throws the numbered wheel against the paper to print the correct number, but also advances the type wheel and carriage M85 along the sheet into the position for the next number.

At the end of a line on the record sheet, it is necessary to return the carriage M85 containing the printing wheel and its associated mechanism, to the left hand margin of the sheet, and also to advance the record sheet one line. The carriage is returned to the left by the rotation of the worm shaft M84 which is driven by the motor M79. At this time, latch arm M81 is not in its notch on disk M82, as coil M70 is energized. Coil M60 is also energized at this time. However, when the carriage reaches the left hand margin, it engages a limit switch which opens contacts M71—M72 and closes contacts M72—M73. This deenergizes coil M70 and causes latch arm M81 to drop into the notch M82 thus aligning the carriage with the left margin of the record sheet. As the latch arm locks into its position in the notch, the contacts M75—M76 are broken, removing the supply feed from the motor. After the carriage is returned to the left, the record sheet is advanced one line by the action of the ratchet arm M61 on the ratchet wheel M62 (coil M60 having been deenergized by the opening of contacts M71—M72). There is geared to the end of the platen M69 a cam M64 with a diameter and gear ratio such that it will make one complete revolution when the platen rotates the distance equal to the height of one complete record form. This cam is so adjusted that when one record sheet is filled, the contact arm M66 drops into the notch on cam M64. This closes contacts M65—M66, putting feed on coil M60 on K3—K4 through M63, thus stepping shaft M62 around (by means of ratchet arm M61 and interrupting switch M63) and inserting the new form. By this time, contact arm M66 is again on the raised surface of cam M64, breaking contacts M66—M65 which interrupts the supply to coil M60. The printing mechanism is now in position to repeat its entire operation.

Provisions have also been made for manual control of the printing mechanism. This is desirable because it enables the operator to type line or circuit numbers on the record sheet, and also permits the taking of readings at times other than those called for by the clock K. For this purpose, buses +1 and —2, which are energized at all times, have been extended into the housing of the printing mechanism. Switches M100 to M109 operate the numbered stops M0 to M9 substantially as follows: Closing the switch M100 projects the stop M0 into blocking position and causes the printing mechanism to print the figure "0"; closing switch M101 projects the stop M1 into blocking position and causes the printing mechanism to print the figure "1," etc. The printing of each figure steps the carriage along one space as previously described. Closing the switch MT energizes coil M50 through the auxiliary relay M50X and causes arm M53 to rotate until it strikes stop M11, thus printing the letter "T" to indicate "total." Closing the switch M290 energizes coil M90 through the auxiliary relay M90X and merely advances the carriage one space without doing any printing. This is the equivalent of a space bar on a typewriter. Similarly, there is a manual carriage return switch M260. Closing this switch energizes M70 and M60 through contacts M72—M71 causing the return of the carriage and the advancing of the record sheet one line as previously described. If, for some reason, it is desirable to take a set of readings even though the contact making clock K does not call for a reading, the switch M299 may be closed, energizing coil P9, thus starting the regular sequence of readings.

It can be seen that the relays M50X and M90X are merely auxiliary relays which in turn energize coils M50 and M90. This permits a smaller current through the contacts of the rotating switches and a heavier current through the coil M50 and M90, which must exert considerable pull.

Figure 7:
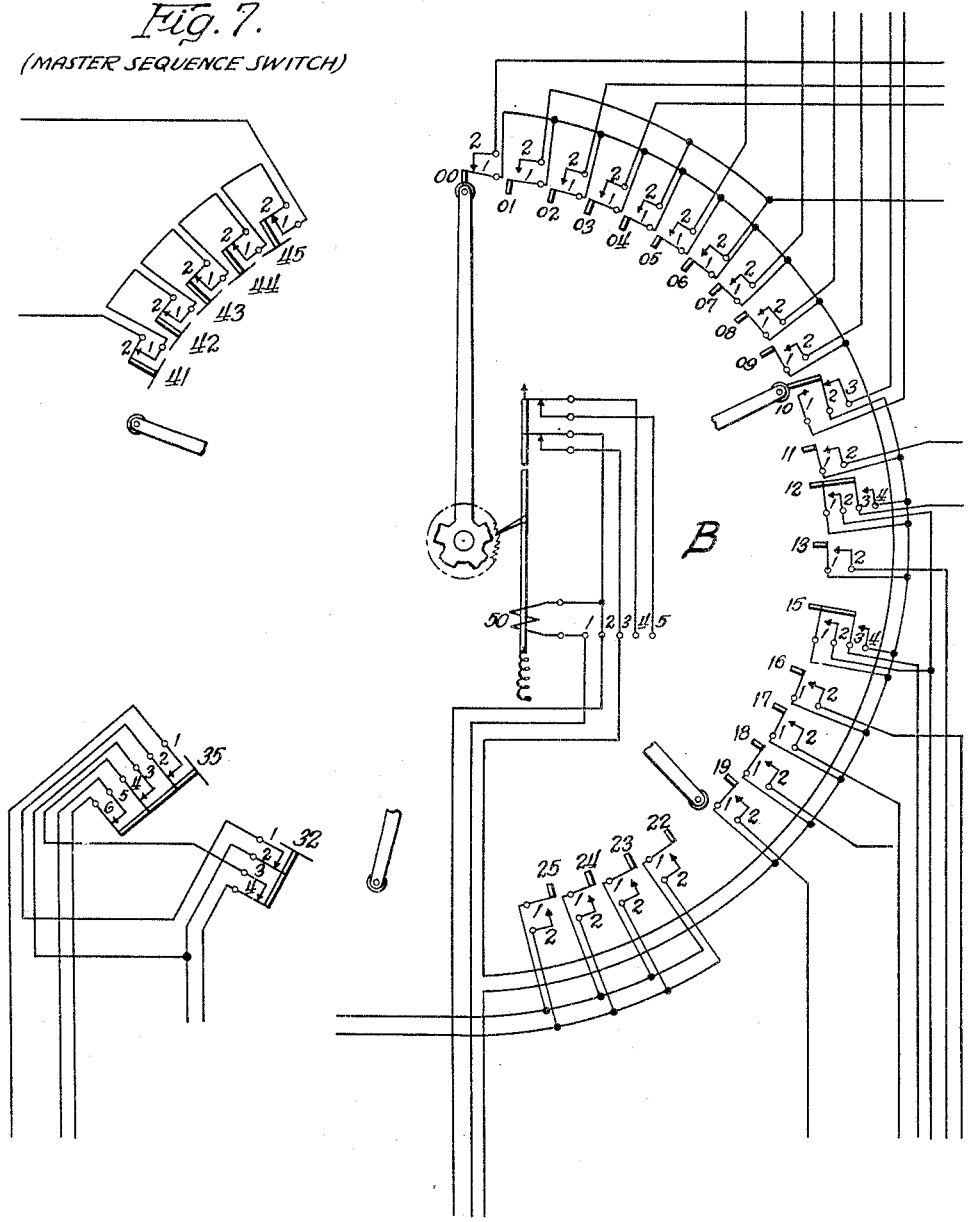
Figures 7, 8 and 9 are similar views of different rotary switches used in the apparatus.

The previously mentioned rotary switches AU, AT, B, etc., are preferably 50 point switches similar in construction and operation to the embodiment shown in the copending application of James R. Harrington and Boyd H. Smith, Serial No. 350,716, filed August 3, 1940, on "Rotary switch." The master sequence switch B will first be described as an example, this switch being illustrated in Figure 7. Switch B comprises five rotating arms which are mechanically connected and occupy successive positions with the stepping of the switch, the switch having a forward or clockwise direction of rotation only. In the zero or home position of the switch rotor, as indicated in Figure 7, the first arm is in position "00," thus closing contact between 001 and 002; the second arm at that time is in position "10" thus breaking contacts between 101 and 102 and making contact from 102 to 103 and the third, fourth and fifth arms at this same time are opposite positions "20," "30," and "40," respectively, which in this case happen to be blank positions. In the schematic circuit diagram of Figures 3, 4, and 5, all contacts on the rotary switches are shown in the positions they assume when there are no arms on the switch. Contacts of relays are shown in the deenergized position. As previously described, in the numbering systems used on these rotary switches, the first letter or letters will indicate the particular switch; the next two digits will be numbers indicating the position of the arm on that switch; and the next (and last) two digits will be numbers identifying the contacts which are made or broken when the switch arm is in that (the previously indicated) switch position. For example, the number "B1023" represents an arm on switch "B" in position 10, making contacts 2 and 3 in that position; but in Figure 7, the letter "B" will appear associated with the complete switch, and only the last two digits at position 10 will be written opposite the contact points. On the schematic diagram of Figures 3, 4, and 5, because of the arbitrary grouping of contacts without reference to physical position, the letter identifying each switch or relay will appear at each switch position or relay contact.

A further detail of master sequence switch B as shown in Figure 7, is that all of the arm positions can have contacts of the bridging type, if desired. As an alternative arrangement, some of the arm positions can have contacts of the bridging type and others can have contacts of the non-bridging type. For example, the arm positions 00 to 19, inclusive, can have contacts which are of the non-bridging type; that is, an arm in moving from position 00 to 01 breaks the contacts B0012 before making the contacts B0112. Contacts of the non-bridging type are indicated in Figure 7 by a narrow bar against which the rotary switch arm presses. This distinction can not be made on the schematic diagram of Figures 3, 4, and 5. Arm positions 41 to 45, inclusive, of switch B have contacts which are of the bridging type; that is, a rotary switch arm in moving from position 41 to position 42 breaks the contacts B4212 before making contacts B4112. Contacts of the bridging type are indicated in Figure 7 by wide bars against which the rotary switch arms press. In the schematic diagram of Figures 3, 4, and 5, the following arm positions have bridging contacts: C46 to C49, inclusive, B22 to B25, inclusive, B32, B35, B41 to B45, inclusive, AT11 to AT20, inclusive, AT29, AT30, AU12 to AU20, inclusive, AU30 and AU31. All other contacts can be non-bridging.

All eight rotary switches AU, AT, B, BS, C, SU, ST, and SH are similar in construction, each having 50 positions. All of these rotary switches except the circuit selector switch C have five arms, this circuit selector switch C having only one arm. In the case of all switches except C, it does not necessarily hold that in each position an arm is opposite a contact or set of contacts; the arm may be opposite a blank.

Figure 8:
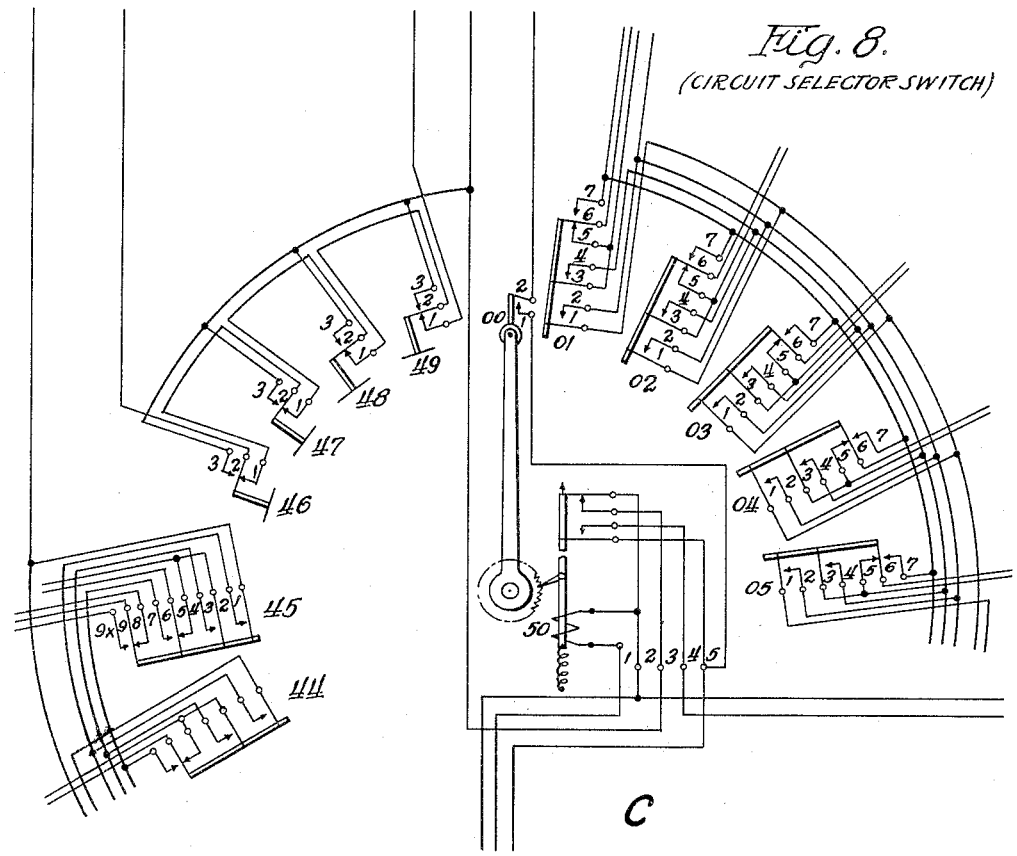
Figure 10:
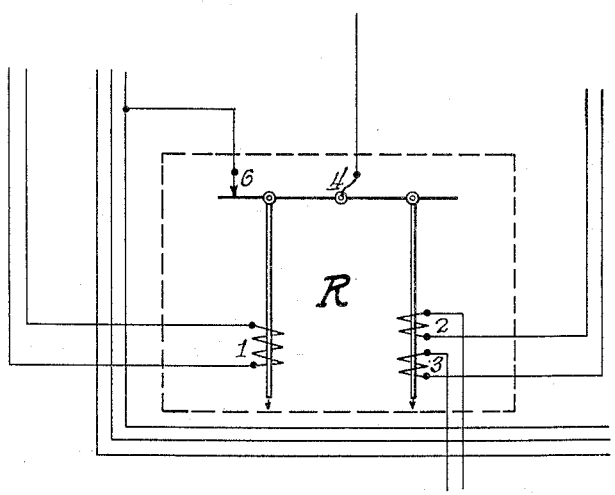
Figure 10 is a diagrammatic view of the balancing relay.
Figure 9:
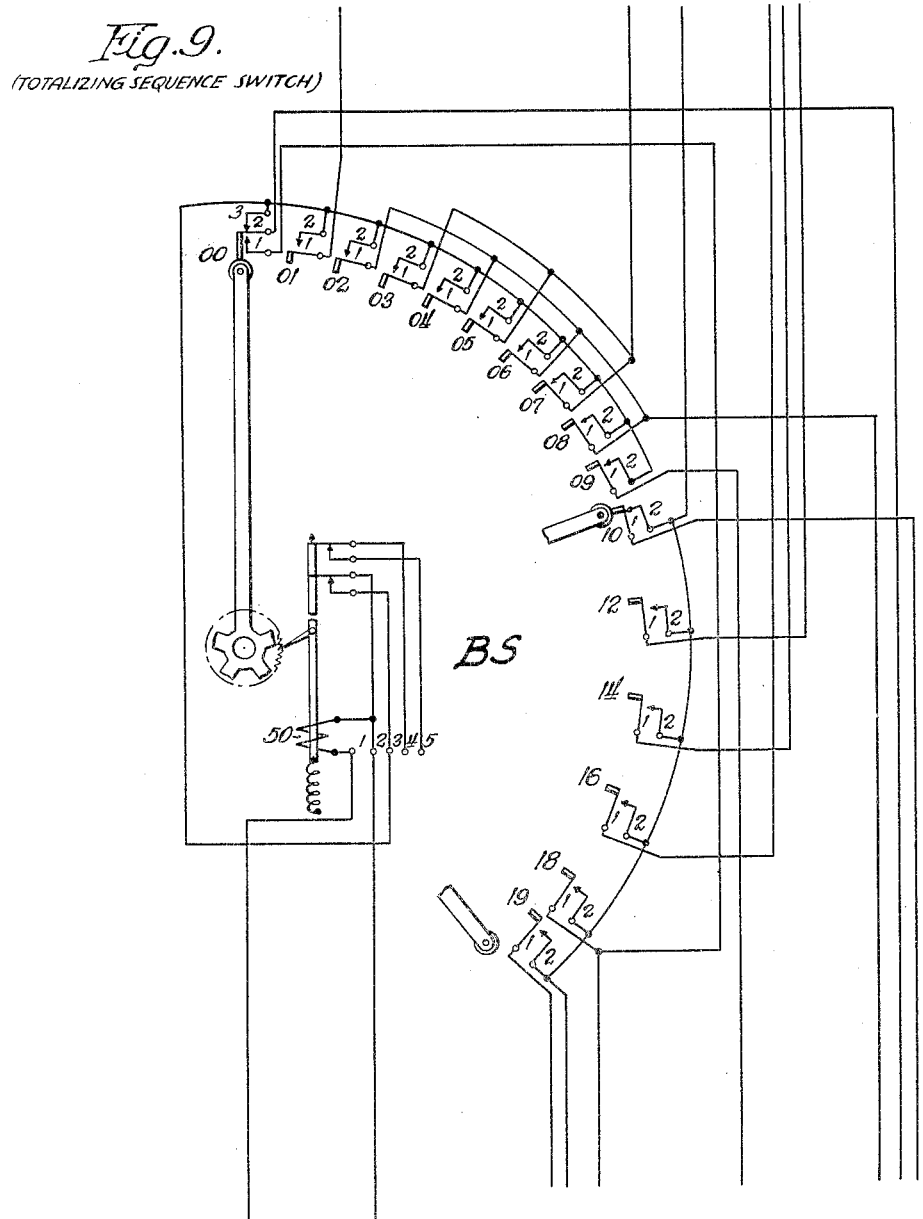

Figure 8 shows in greater detail the previously mentioned circuit selector switch C, which selects the circuit or line within which the current flow is to be measured. Only a few of the switch arm positions 06 to 43 are similar to positions 01 to 05. Similarly, in the diagrammatic layout of Figures 3, 4, and 5, only a part of the positions have been shown so as to simplify the illustration. Previously described Figure 7 illustrates the master sequence switch B, which imposes the proper sequence on the mechanism for measuring current. Figure 9 illustrates the previously mentioned totalizing sequence switch BS. Switches AT and AU rotate to balance the current in balancing relay R, the coil R1 of this relay receiving the current from the line or circuit being measured. The final positions of rotary switches AT and AU are an indication of the measured value of current.

The metering transformer J has a primary coil J1 and two secondary coils J2 and J3. Primary coil J1 is connected to a constant potential alternating current source. For convenience in calibrating, the coil J1 has been tapped and the taps brought to the voltage regulating terminal block JN. The coil J2 has approximately 10 times the terminal voltage of the coil J3.

The balancing relay R includes a coil R1 which exerts a pull in a downward direction when energized. The pull of this coil is against the pull of coils R2 and R3 through the balancing arm R4. The relay is so balanced that with all of the coils de-energized, the arm R4 will make contact with contact points R6. When the pull of coil R1 exceeds that of coils R2 and R3, arm R4 breaks engagement with contact points R6.

Coil R1 of the balance relay R is energized from the secondary of the current transformer in the circuit or line whose current is to be measured.

To the coil R2 of the relay R is applied the terminal voltage of coil J2 of transformer J. This voltage is applied not directly but through the resistors E1 to E9, inclusive. These resistors have varying values, and as the rotary switch AT steps around these resistors are shunted out, one resistor for each step of switch AT. This operates to increase the current in coil R2 by definite, equal steps. Now, after the first step of switch AT, there will be a certain amount of current in coil R2, causing it to exert a definite pull downwardly. By choice of proper current transformer ratios in the circuits to be metered, and by proper calibration of the resistors, this pull of coil R2 will be exactly equal to the pull exerted by coil R1 when the current in it corresponds to 10 amperes in the primary circuit of the line to be metered. Likewise, after the second step of AT, the pull of coil R2 will be exactly equal to that of coil R1 when the current in the latter corresponds to 20 amperes in the primary of the circuit to be metered. Similarly, to coil R3 of the balance relay R is applied the terminal voltage of coil J3 of transformer J. This voltage again is not applied directly but through resistors E11 to E19, inclusive. These resistors, too, have varying values, such that as switch AU steps around, these resistors are shunted out, one for each step of switch AU, increasing the current in coil R3 in definite, equal steps. After the first measuring step of switch AU, there will be a certain amount of current in coil R3, causing it to exert a definite pull downwardly. Here again, by proper calibrations of circuit constants, this pull in coil R3 will be exactly equal to the pull exerted by coil R1 when the current in the latter corresponds to one ampere in the primary of the circuit being metered. After the second step of rotary switch AU, the pull of coil R3 will be exactly equal to that of R1 when the current in the latter corresponds to 2 amperes in the primary of the circuit being metered. In this manner, the balancing of relay R constitutes the measuring of the value of primary current in the line or circuit.

The functions of the totalizing switches SU, ST and SH, and of the totalizing sequence switch BS, will be brought out more clearly in the description of the sequence of operations.

In each rotary switch the coil 50, when energized, lifts against a spring. When the coil is deenergized, the arm rotates to the next position by the action of the spring against the ratchet. To prevent sparking at the contacts which make and break the circuit through these coils, condensers CN are connected across the contacts.

Relay RX is an auxiliary relay which remains deenergized until a balance point is reached (when contact R6 of balancing relay R closes) or the balance point is exceeded (when the current to be measured varies, as from 39 to 40 amperes, while the balancing of relay R is in process).

Relay T and relay U are simple auxiliary relays that close their contacts when energized, supplying feed to the AT, ST and AU, SU rotary switches, respectively. A condenser is connected across the coil of relay U to slow it down to a desirable speed.

The relay V is a time-delay drop-out relay. Its purpose is to prevent increasing amounts of current being put in the coil R2 of balancing relay R by the metering switch AT (through relay T) until the balancing relay R has had time to overcome its inertia and reach a balance for the previous step of current. Relay V is connected in such a manner that relay T cannot close its contacts until relay V has dropped out.

In practice, several contacts of the T, U, M50X, and M90X relays have been paralleled to assure more reliable operation and decrease wear on contacts, but I have not deemed it necessary to illustrate this paralleled relation of contacts in the schematic diagram of Figures 3, 4 and 5.

The metering equipment also includes two terminal blocks G and L, which are fragmentarily indicated in Figure 3. To terminal block L are connected the circuits from the secondaries of the current transformers on the distribution lines. Suitable test switches are preferably interposed in these secondary circuits. The contact points on terminal block G are permanently connected to corresponding points on the circuit selector switch C; for example, G01 is connected to C01, G02 is connected to C02, etc. Jumper connections are used between the two terminal blocks G and L so that lines may be metered in any order desired without disturbing any of the permanent wiring. Thus, the secondary of the current transformer on line 1311 is permanently connected to L1311; L1311 is in turn connected by a jumper to G1, and G01 is permanently connected to C01.

*Sequence of operation*

For ease and simplicity in tracing through a sequence of operation, let us assume that all of the current transformer ratios are 1:1, that the coils of relay R all have the same number of turns, and that the equipment can carry current to the full extent of its calibration, 99 amperes. Then, the pull of one ampere in coil R1 will be exactly balanced by the pull of one ampere in coil R3, and 10 amperes in coil R1 will be exactly balanced by 10 amperes in coil R2.

With all rotary switches standing in the zero or home position and the power supply contactor P open, the clock makes contact and permits current to flow in the path from positive bus 1 through K1, K2, coil P9 to negative bus 2. This energizes positive bus 5, negative bus 6 and the two A. C. buses 7 and 8. Current then flows from positive bus 5 through point B1023, coil C50 to negative bus 6. This picks up coil C50 and completes the circuit from 5 through C54, B0021, B32, and coil B50 to bus 6, which causes this coil to pick up, interrupt its own circuit, and advance switch B to position 01. In moving off position 00 switch B breaks the circuit from bus 5 (at B1023) through coil C50 and advances rotary switch C to position 01. Also, when switch B moves off position 00, it makes the circuit from bus 5 through B1021 to parallel the clock contacts and holds contactor P closed. This circuit is also paralleled through C0012 when switch C is off the zero position.

In position 01 of switch B, the arm at B41 opens the connection B4112 and removes the short circuit on coil R1, which is normally maintained through B4121, B4221, B4321, B4421, and B4521. Also, in position 01 of switch B, the arm at B11 closes the circuit from bus 5 through B1112 and coil V10 to bus 6. Energizing V10 closes contact V78, completing the circuit from bus 5 through B1112, V78, B0121, B32, and coil B50 to bus 6, thus moving switch B to position 02. This step at B01 is necessary to allow the current in coil R1 to reach its full value and to prevent relay T from operating too quickly.

In the meantime, coil R1 of relay R has been energized from the circuit to be measured from the lower stud of G01 through C0134, coil R1, C0176 to the upper stud of G01. This has caused relay R to break contact at point R6.

In position 02 of switch B, coil R1 continues to be energized because the short circuit is broken at B4212. Also at position 22, transformer J is energized through B2212 and coil J1 from buses 7 and 8. When transformer J is energized, a circuit is completed from J3 through AU2021, coil R3 to J3. This causes a current of 9 amperes to flow in coil R3 so that relay R will make contact from R4 to R6, if the current in coil R1 is less than 9 amperes. For this example, we shall assume that the current in R1 is 36 amperes. Therefore, the contact R6 remains open. As switch B moved from position 01 to position 02, the circuit to coil V10 was interrupted at B1112. Coil V10 now drops out relatively slowly, allowing contact V91 to close.

Now, at position 12 of switch B, connection is made from bus 5 through B1243, V91, RX34, AT2921, coil T10 to bus 6. This energizes relay T and completes the circuits from bus 5 through T93, AT50, to bus 6, and T92, ST50 to bus 6, energizing AT50 and ST50. Energizing coils AT50 and ST50 closes contacts ST54 and AT54. This completes the circuit from bus 5 through B1243, ST54, AT54, and coil V10 to bus 6. Energizing V10 opens the contact V91, thus interrupting the feed to coil T10. This, in turn, deenergizes coils AT50 and ST50, as their feed is interrupted at T93 and T92 respectively, causing switches AT and ST to step ahead to position 01. As coils ST50 and AT50 are deenergized, the contacts at ST54 and AT54 are opened. This interrupts the supply to coil V10 and will allow V91 to close. (Contact V91 will close relatively slowly as the coil V10 has a time-delay drop-out.)

In position 01 of switch AT, a circuit is completed from transformer coil J2 through E9 to E1, inclusive, AT1121, coil R2 to J2. This puts a current in coil R2 equal to 10 amperes. Therefore, the total pull of coils R2 and R3 is equal to 19 amperes and not sufficient to overbalance coil R1. Relay T is then again picked up through bus 5, B1243, V91, RX34, AT2921, and T10 to bus 6. As previously described, this advances switches AT and ST to position 02.

In position 02, a circuit is completed from J2 through E9 to E2 inclusive, AT1221, coil R2 back to J2, producing a current in R2 equal to 20 amperes instead of 10, or the total pull of coils R2 and R3 is now equal to 29 amperes, still not sufficient to overbalance coil R1. Therefore, the process of energizing relay T is repeated, advancing switches ST and AT to position 03.

In position 03 of switches AT and ST, the current in coil R2 is equal to 30 amperes, that in coil R3 is equal to 9 amperes, or the total pull of the 2 coils exceeds that in R1. Relay R then makes contact from R4 to R6. In this position the circuit is completed from bus 5 through B1212, R4, coil RX10, to bus 6, causing relay RX to close and to be sealed in by positive feed from B1212 through RX15 and coil RX10. Also in this position, the circuit is completed from bus 5 through B1243, V91, RX32, T81, AT0312, coil M3, and coil 10 on relay M50X to bus 2. This pulls out the stop M3 and closes the contacts on relay M50X putting positive feed from bus 1 through the contacts M50X19 and coil M50 to bus 2. This pulls down the lever M51 rotating the shaft M52 and arm M53 until the arm strikes the stop M3. As the lever M51 moves downward, contact is made from bus 1 through M55, M54, and coil 10 on relay M90X to bus 2. Relay M90X now being energized closes its contacts thus putting positive feed from bus 1 through the contacts M90X19 through coil M90 to bust 2. This causes the rack M94 to be pulled down, rotating shaft M95 to print the digit "3," thus completing the printing operation. As the rack M94 moves down, contact is made from bus 1 through M92, M93, B0221, B32, and coil B50 to bust 6, advancing switch B to position 03. When switch B leaves position 02, the positive supply to coil 10 of relay RX is interrupted at B1212, also the positive feed from B1243 through the RX relay to the AT switch is now open at B1243. The RX relay is therefore deenergized and stays that way until switch B reaches position 05 and a new balance is obtained, in this case at 36 amperes. In position 03 of switch B, the short circuit on coil R1 continues to be broken by the arm at point B4312, and coil J1 of transformer J continues to be energized through B2312. Also at position 13, a circuit is made from bus 5 through B1312, AU3121, B3565, AU32, coil AU50 to bus 6. This energizes and deenergizes AU50 advancing this switch to position 01.

In position 01 of switch AU, the fourth arm is at AU31 and a circuit is complete from bus 5 through B1312, AU3123, B0321, B32, and B50 to bus 6, advancing switch B to position 04.

In position 04 of switch B, coil R1 continues to be energized as before because the contact at B4412 is broken.

Transformer J is energized through B2412 and coil J1. Coil R2 then carries a current of 30 amperes as switch AT has remained in position 03. However, there is no current in coil R3 as switch AU is now in position 01 (the second arm being at AU11 and the third at AU21—both blank positions) and there is no circuit in this position to coil R3. Therefore, the pull in coil R2 is not equal to the pull in coil R1 and relay R breaks contact from R4 to R6. A circuit is now already completed from bus 1 through M55, M56, B0421, B32, and coil B50 to bus 6, causing switch B to move to position 05. This completes a circuit from bus 5 through B1543, RX87, AU1021, AU54, coil U10 to bus 6. AU54 is also paralleled by SU54. This circuit energizes relay U and makes a circuit from bus 5 through U91 to coil AU50 also through U93 to coil SU50. This picks up coils AU50 and SU50, breaking contact at AU54 and SU54 to release relay U and coils AU50 and SU50. This advances switch AU to position 02 and switch SU to position 01. The circuit is then made from transformer coil J3 through E19 to E11, inclusive, point AU1221, coil R3 back to J3. This makes the current in coil R3 equal to 1 ampere, or a total in R2 and R3 of 31 amperes which is less than the 36 amperes for coil R1; therefore, contact R6 remains open. The process of energizing relay U is then repeated, as before, advancing switches AU and SU simultaneously until switch SU reaches position 06 and switch AU reaches position 07.

In position 07 of switch AU, the second arm is at AU17 and a circuit is completed from coil J3 through E19, E18, E17, E16, AU1721, coil R3 back to J3. This produces a current equal to 6 amperes in R3 which, added to the 30 amperes in R2, balances the 36 amperes in R1, therefore causing the contact R6 to close. This completes the circuit from bus 5 through B1512, R4, R6, coil 10 of relay RX, to bus 6, causing relay RX to close and to be sealed in by positive feed from B1512 through RX15 and coil RX10. This also completes the circuit from bus 5 through B1543, RX89, U78, AU0712, coil M6, coil 10 of relay M50X, to bus 2. This repeats the printing process, described previously, to print the digit "9." Contact is then made from bus 1 through M92, M93, B0521, B32, and coil B50 advancing switch B to position 06. As the arms of switch B leave positions 25 and 45, coil R1 is short-circuited and transformer J is deenergized.

In position 06 of switch B (the second arm being at B16), a circuit is made from bus 5 through B1612, AU3021, B3565, AU32, coil AU50 to bus 6. This picks up coil AU50, breaking its own circuit and advancing the switch to the next position. This process repeats until switch AU reaches position 00, and interrupts the contact, AU3021. Simultaneously, with the rotation of switch AU back to its zero position, the circuit is also completed from bus 5 through B1612, AT3021, AT32, coil AT50, etc., ratcheting switch AT around to position 00. When both AT and AU are in position 00, the circuit is completed from bus 5 through B1612, AU3023, AT2021, M90X78, B0621, etc., moving switch B to position 07. In position 07, circuit is made from bus 5 through B1712, C0121, coil 10 of relay M90X, to bus 2. This is turn energizes coil M90 without energizing any of the stop coils. Therefore, shaft M95 rotates to step the carriage to the right one space with no figure in contact with the paper, so that a space is indicated on the record sheet. Then the contact is made through M92, M93, B0721, B32, and coil B50, advancing switch B to position 08.

In position 08, circuit is made from bus 5 through B1812, BS1021, C4598, B0821, etc., advancing switch B to position 09.

In position 09, the circuit is completed from bus 5 through B1912, C4621, C4721, etc., to B0921, advancing switch B to the zero or home position.

In the zero or home position, the circuit is made from bus 5 through B1023, C50 to bus 6. This energizes coil C50, picking it up and making a circuit from bus 5 through C54, B0021, advancing switch B to position 01. This breaks contact at B1023, deenergizing coil C50 and moving switch C to position 02. The metering sequence is performed in this position exactly as described for position 01, except that it will be noted that switch ST and switch AT step forward simultaneously, but that switch AT begins in the zero position, while ST begins in the position which it had at the end of the reading on the previous circuit. Therefore, the total number of steps taken by switch ST will be the sum of the steps taken for the reading on the first and second circuits.

It will also be noted that switch SU was not returned to its zero or home position and begins its rotation from the position of the previous reading instead of from the home or 00 position.

It may be assumed that it is desirable to record the total reading on the first five lines of the meter. This will be accomplished in the following manner: We may assume that switch C is in position 05, which is the position to record the meter reading on the fifth circuit, and that the sequence of recording the reading on this circuit has been completed so that sequence switch B has just advanced from position 05 to position 06. Switches AT and AU are then returned to their normal or zero position, but switches SH, ST, and SU remain in the position indicating the summation of the readings on the five circuits metered. Switch B now advances from position 06 to position 07. It may be assumed that the total of the first five meter readings was 234. In this case, switch SH will be in position 02, switch ST will be in position 03, and switch SU in position 04.

A circuit is now made from bus 5 through B1712, C0521, BS0023, BS32, coil BS50 to bus 6. This energizes and deenergizes coil BS50, advancing switch BS to position 01.

As switch BS leaves position 00 and advances to position 01, the circuit is made from bus 5 through B1712, C0521, BS0021, and coil 10 of relay M90X. This in turn energizes M90 without energizing any of the stop coils and causes the carriage to be stepped one space to the right as previously once described. Then contact is made through M92, M93, B0721, B32, and coil B50, advancing switch B to position 08.

In position 01 of switch BS and position 08 of switch B a circuit is made from bus 5 through B1812, M90X32, BS0112, BS32, coil BS50, advancing switch BS to position 02.

In position 08 of switch B, and position 02 of switch BS, a circuit is made from bus 5 through B1812, BS1221, SH0212, coil M2, coil 10 of relay M50X to bus 2. The numeral "2" is recorded on the record sheet by the printing process previously described and the circuit is completed from bus 1 through M92, M93, BS0212, BS32, and coil BS50 to bus 6, advancing switch BS to position 03.

In position 03, a circuit is made from bus 1 through M92, M91, BS0312, BS32, etc., advancing switch BS to position 04.

In position 04 of switch BS, a circuit is made from bus 5 through B1812, BS1421, ST0312, coil M3, coil 10 of relay M50X to bus 2. This prints the digit "3" on the paper and makes the circuit from bus 1 through M92, M93, BS0412, BS32, etc., advancing switch BS to position 05.

In position 05, the circuit is made from bus 1 through M92, M91, BS0512, etc., advancing switch BS to position 06.

In position 06 of switch BS, the circuit is made from bus 5 through B1812, BS1621, SU0412, M4, coil 10 of M50X to bus 2. This prints the digit "4" on the paper and makes the circuit from bus 1 through M92, M93, BS0612, etc., advancing switch BS to position 07.

From position 07, the switch is immediately advanced to the next position as from positions 03, and 05.

In position 08 of switch BS, the circuit is made from bus 5 through B1812, BS1821, coil 10 of relay M90X to bus 2. This makes a blank space on the paper and completes the circuit from bus 1 through M92, M93, BS0812, etc., advancing switch BS to position 09.

In position 09 of switch BS, the circuit is made from bus 5 through B1812, BS1921, SH1021, SH32, coil SH50 to bus 6, ratcheting switch SH around to position 00, when this circuit is broken at SH1021. Simultaneously switch ST is ratcheted around to its home position through B3243, B3543, ST1021, ST32, etc. Also, simultaneously, switch SU is ratcheted to its home position through B3221, B3521, SU1021, SU32, etc.

When all three switches, SH, ST, and SU, are in the home position, the circuit is made from bus 5 through B1812, BS1921, B3243, B3543, B3221, B3521, SU1023, ST2021, SH2021, BS0912, BS32, coil BS50, advancing switch B Sto the zero or home position. In the zero position, the circuit is made from bus 5 through B1812, BS1021, C4598, B0821, etc., advancing switch B to position 09.

The total reading has now been recorded, the totalizing switches restored to their zero or home positions and the sequence continues for following circuits, as previously described.

It may now be assumed that there are a total of 45 circuits to be metered by the metering equipment, and that the last circuit is connected to point C4556 of the metering equipment through corresponding points on the terminal block, G. It is also assumed that a total reading is to be taken after the meter reading on circuit 45.

It may now be assumed that the meter reading has been recorded for circuit 45 and the total has also been recorded, as previously described, so that switches SH, ST, SU, AT, AU, are in the zero position, switch C is in position 45 and switch B is in position 08, and switch BS has just stepped from position 09 to position zero or the home position. The circuit is then made from bus 5 through B1812, BS1021, C4599X through contacts M72, M71, M67, M66, and coil M60 to bus 2. This energizes coil M60. Simultaneously coil M70 is also energized through contacts M72, M71, which causes the armature M80 to be pulled over to the core of coil M70, thus disengaging the latch M81 from the notch in disc M82. This closes the contacts M75, M76 and completes the circuit through M77, M78 to bus 2. The motor is then energized and free to rotate, returning the carriage M85 to the left on shaft M84.

When the printer carriage returns to the left hand margin, it strikes the limit switch breaking the circuit at M72, M71, releasing the coils M60 and M70. Deenergizing M60, causes the ratchet on arm M61 to advance the paper form to the next line for the next reading, and deenergizing M70 releases the armature M80 causing the latch M81 to drop in its notch on M82. The carriage is then perfectly lined up with the left hand margin of the printed form. The motor M79 still spins for an instant but it does so freely as there is a clutch release between the motor and the shaft M82. As M80 is released, the circuit to the motor is broken at M75, M76.

The limit switch now makes a circuit between points M72 and M73 completing the circuit from bus 5 through B1812, BS1021, C4599X, M72, M73, C32, coil C50 to bus 6, energizing and deenergizing coil C50 to advance this switch to position 46. When this switch leaves position 45, switch 45 makes contact at point C4598, completing a circuit through B0821, etc., advancing switch B to position 09.

In position 09, the circuit is made from bus 5 through B1912, C4623, C32, and coil C50, advancing switch C to position 47. In this position, the circuit is completed through C4621, C4723, etc. By similar steps, switch C is advanced to position 49. In position 49, a circuit is made from bus 5 through B1912, C4621, C4721, etc., advancing switch C to the home position. When switch C leaves position 49, a circuit is made from bus 5 through B1912, C4621, C4721, etc., to B0921, advancing switch B to the zero position.

In the zero position of switch B, the circuit from bus 5 to K2 is broken at B1012. This circuit has also been previously broken at point C0012; therefore, coil P9 of supply contactor P is deenergized, and the metering operation stops until the next impulse from the clock K.

A further detail of the operating sequence, not covered in the previous description, is the condition which exists when switch SU advances from position 09 to position 00, during a metering operation. This is assumed to take place when the second or third reading is being taken in the given group, so that the advancing of switch AU begins in position 01, while the advancing of switch SU begins in some other position, for example, position 09.

In position 09 of switch SU, a contact is made at point SU1912. In this position, the energizing of relay U not only energizes coil SU50 to advance this switch to position 00, but a contact is also made from bus 5 through U92, SU1921 and coil ST50, so that switch ST will advance one step simultaneously with the advancing of switch SU from 09 to 00. This transfers the units total to the tens column in a process of addition. A similar sequence can be traced to show that switch SH will advance one step at the time that switch ST advances from position 09 to position 00 through the operation of relay T.

There is further slight modification in the sequence to take care of another condition which may occur. For example, if the meter comes to balance on the "tens" digit from a meter reading equal to 39 amperes, and, if the current should increase to more than 40 amperes before the units digit has had opportunity to balance, it will be seen that the meter will print a "9" regardless of whether or not the relay R balances at this point. The operating sequence in this case is as follows:

Assume that the figure "3" has already been printed, that switch B is in position 05, and that AU rotates to position 00 without making contact at R6. A circuit is then completed from bus 5 through B1543, RX87, AU1023, and coil 10 of relay RX. This energizes the RX relay and completes the circuit from bus 5 through B1543, RX89, U78, AU0012, coil M9, coil 10 of M50X to bus 2, causing the meter to print the digit "9." When the meter prints the digit "9," contact M92, M93 advances switch B to the next position, as previously described.

If, for any reason, the current to be metered exceeds the calibration limit of the circuit, a similar operation takes place to cause the meter to print the figure "99." The first step in this sequence assumes that switch B is in position 02, so that a circuit is made from bus 5 through B1243, V91, RX34, AT2921, etc., advancing switches AT and ST through the operation of relay T. If switch AT reaches position 09 and relay R has not yet operated, a circuit is then completed from bus 5 through B1243, V91, RX34, AT2923, coil M9, coil 10 of M50X to print the digit "9" and advance switch B to the next position. A figure "9" is then printed for the units digit, as described in the preceding paragraph.

In the preceding portion of the description pertaining to the printing mechanism M, I have described how said printing mechanism may be manually operated through the medium of the push-button switches M100 * * * M109, MT, M290, M260 and M299. This enables the operator to type the line or circuit numbers on the record sheet 200, and also permits the taking of readings at times other than those called for by clock K, etc.

My improved system can also be adapted to measure and record watts if desired. In such an arrangement, relay R would be constructed of the dynamometer or moving coil type instead of the iron core type. This is illustrated diagrammatically in Figure 3A which may be substituted for the corresponding part of the lower left corner of Figure 3.

Referring to Figure 3A, relay R consists of two dynamometer elements acting in opposition. One element consists of a movable coil R9 connected through flexible leads to an additional constant potential coil J4 in transformer J. The movable potential coil R9 is acted upon by the stationary current coils R2 and R3 connected as previously described in connection with Figures 3, 4 and 5. The second dynamometer element consists of a movable potential coil R8, connected by flexible leads to the potential connections added to circuit selector switch C, and a stationary current coil R1 connected to circuit selector switch C as shown in Figures 3 and 8.

Figure 3A illustrates the connections for only one of the circuits to be measured, namely line 1311. This line is equipped with a current transformer and a potential transformer for measuring power. In position 01 of switch C a circuit is completed from the current transformer of line 1311 through G011, C0134 coil R1, C0167 and G012 back to the current transformer. At the same time a circuit is completed from the potential transformer on the line through G013, C018 and 8x coil R8, C019 and 9x and G014 back to the potential transformer. The measuring totalizing and recording operations are accomplished in the manner previously described. The pull in one relay element is proportional to the power to be measured and the pull in the other element is proportional to the positions of switches AT and AU.

My improved system can be adapted for measuring pressure of air, water, etc., in pipes, reservoirs and the like. Such an arrangement is illustrated in Figure 3B which might be substituted for the lower left corner of Figure 3. In this arrangement the coil R1 of relay R is substituted by a bellows or Sylphon R10 whose internal pressure exerts a downward pull on the left hand arm of balancing beam R4 of relay R. In Figure 3B the moving of selector switch C to position 01 closes contacts C0134 and completes a circuit through coil G, of the solenoid on the first pipe line whose internal pressure it is desired to measure. This applies the pressure to the bellows R10. The printing system then measures, totalizes and records the pressures in the same manner as described for electric currents.

Instead of having a single balancing relay R which is successively connected to the plurality of load circuits, the system may be adapted to have a plurality of balancing relays RA, RB, etc., one for each circuit whose characteristic is to be measured. This is particularly suitable when it is desired to measure several different characteristics on the same metering system. For example, it may be desired to measure the pressure and temperature of the steam which drives a steam turbine and simultaneously to measure the current and power coming from the electric generator driven by the turbine.

This variation in the scheme is accomplished by having coil R1 of each relay permanently connected in the circuit which it is to measure. The coils R2 and R3 of each relay are all connected in series so that the rotation of switches AT and AU varies the current in the R2 and R3 coils of all relays simultaneously. However, only one relay at a time is used to control the rotation of switches AT and AU and the printing operation.

Figure 3C:
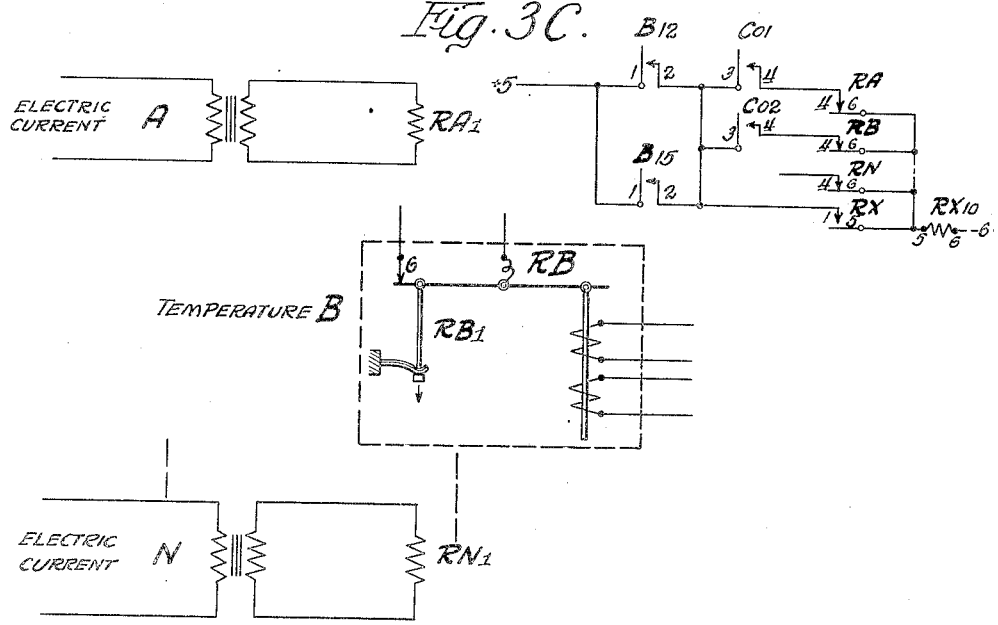
Figures 3C and 4C are fragmentary diagrams, adapted for substitution in Figures 3 and 4, for the purpose of disclosing still another embodiment of the invention.

This variation has been illustrated in Figures 3C and 4C which may be substituted for corresponding parts of Figures 3 and 4, respectively, to show the operation of the scheme with this variation. In Figure 3C, the several R1 coils of the several balancing relays have been designated RA1, RB1 * * * RN1. Each of these is permanently associated with its own characteristic to be measured, and not connected in any way with the circuit selector switch C. Also in Figure 3C it will be seen that the contacts RA6, RB6, etc., are all connected to point 5 of coil RX10. However, there has been interposed between each of the contacts RA4, RB4, etc., and the contacts of the sequence switch B the additional contacts of the circuit selector switch C. With these contacts, when switch C is in position 01 for example, only the contacts RA46 are effective in controlling the operation of coil RX and consequently the operation of switches AT, AU and the printer as previously described. The operation of the contacts of relays RB * * * RN will have no effect.

The series connection of the coils R2 and R3 is shown in Figure 4C where coils RA2, RB2 * * * * RN2 have been substituted for R2 and coils RA3, RB3 * * * * RN3 have been substituted for R3.

Also illustrated in Figure 3C is a further variation in the metering system to measure temperature instead of current. In this variation, coil RB1 has been substituted by a bimetallic strip which is fixed at one end and so arranged that increasing temperature will increase the downward pull on the arm of relay RB.

While I have illustrated and described what I regard to be the preferred embodiments of the invention, nevertheless it will be understood that such are merely exemplary and that numerous other modifications and rearrangements may be made therein without departing from the essence of the invention.

I claim:

1. In an automatic metering system of the class described, the combination of means for measuring the individual electrical values in each of a plurality of circuits, means for totalizing the figures representing the individual electrical values in a group of said circuits, and printing means connected to both said measuring means and said totalizing means and operative to print said individual electrical values on a record sheet and said totalized electrical values on said same record sheet.

2. In an automatic printing metering system of the class described, the combination of measuring means for measuring the individual numerical values of a plurality of variable characteristics, time responsive means governing the operation of said measuring means, totalizing means for accumulating the individual numerical values of each of said variable characteristics as measured and a single printing device connected to both said measuring means and said totalizing means and operative to print said individual numerical values on a record sheet and the totalized numerical values on said same record sheet as accumulated from said individual numerical values.

3. In an automatic printing metering system of the class described, the combination of measuring means comprising a balancing relay for measuring the individual electrical values in each of a plurality of circuits, time responsive means governing the operation of said measuring means, totalizing means comprising a plurality of rotary switches for totalizing the electrical values in different groups of said circuits, and printing means comprising a record sheet and a rotary type wheel shiftable to different positions relatively to said sheet and operative to print said individual electrical values and said totalized electrical values in spaced columns on said record sheet.

4. In a printing metering system for a plurality of devices having varying characteristics which it is desired to record, the combination of measuring means for measuring said characteristics comprising a balancing relay having tens and units coils acting thereon, and tens and units metering switches controlling the energization of said tens and units coils respectively, selecting means for operatively associating said devices selectively with said balancing relay for the performance of the measuring operations, totalizing means for totalizing a group of the values determined by said measuring means comprising tens and units totalizing switches actuated substantially in step with said tens and units metering switches respectively, printing mechanism responsive to said measuring means and to said totalizing means comprising type characters operative to print figures on the same record sheet which are proportional to both the individual characteristics determined by said measuring means and to the totalized values determined by said totalizing means, a first feeding means for causing relative feeding motion between said record sheet and said type characters in such manner that the sequence of figures corresponding to different individual devices and to the totalized values of different groups of said devices extends parallel to one dimension of said sheet, and a second feeding means operative between printing cycles for causing relative feeding motion between said record sheet and said type characters in such manner that the sequence of figures corresponding to different time intervals extends parallel to another dimension of said sheet, and sequence apparatus comprising a master sequence switch and a totalizing sequence switch controlling the sequence of operations of said metering and totalizing switches and of said first and second feeding means of said printing mechanism.

5. In an automatic printing metering system, the combination of a balancing relay having in one element a current flowing therethrough the instantaneous value of which is to be measured, and in the opposing element a current which is varied by steps, means for varying the current in said opposing element, totalizing means for totalizing a group of measurements made by said balancing relay, a printing mechanism with figures selected by the actuation of said current varying means and by said totalizing means, means for causing said printing mechanism to print on a record sheet figures which are proportional to the current in said opposing element at the time said relay balances, and means for causing said printing mechanism to operate substantially at the time said relay balances and substantially at the time said totalizing means is in condition to record its totalizing operation.

6. In an automatic printing metering system for recording the instantaneous current values of a plurality of circuits and for recording the totalized current value in a group of said circuits, the combination of a selector switch which determines the circuit to be measured, measuring means which balances the current to be measured against known currents, totalizing means for totalizing the current values in a group of said circuits, a printer which prints the figures that correspond to the value of the current as determined by said measuring means and which also prints the figures that correspond to the totalized current values as determined by said totalizing means, a clock to start the printing operation, and auxiliary apparatus including sequence switch means for causing the above operations to be performed in the proper order.

7. In an automatic printing metering system, the combination of measuring means comprising a load coil, a tens coil and a units coil opposing said load coil in a measuring operation, means for successively connecting different load circuits to said load coil, a tens metering switch controlling the current flow in said tens coil, a units metering switch controlling the current flow in said units coil, and printing mechanism responsive to said tens metering switch and to said units metering switch for making a printed record of one of the electrical characteristics of each load circuit connected to said load coil.

8. In an automatic printing metering system, the combination of a balancing relay having a balance beam and comprising a load coil acting in one direction on the balance beam and a tens coil and units coil acting in the opposite direction on said beam, means for connecting different load circuits with said load coil, a tens metering switch controlling the current flow through said tens coil in ten ampere steps, a units metering switch controlling the current flow through said units coil in unit ampere steps, means responsive to said balancing relay governing said metering switches, a tens totalizing switch responsive to said tens metering switch, a units totalizing switch responsive to said units metering switch, and printing mechanism responsive to said metering switches and to said totalizing switches.

9. In an automatic printing and totalizing metering system of the class described, the combination of a balancing relay having a balance beam and comprising a load coil acting in one direction on said beam and tens and units coils acting in the opposite direction on said beam, a circuit selector switch for connecting different load circuits with said load coil, a tens metering switch for increasing the current flow through said tens coil in ten ampere steps, a units metering switch for increasing the current flow through said units coil in unit ampere steps, means responsive to said balancing relay governing said metering switches, a master sequence switch operative to cause said tens metering switch to function in advance of said units metering switch, a tens totalizing switch actuated substantially in step with said tens metering switch, a units totalizing switch actuated substantially in step with said units metering switch, a totalizing sequence switch governing said tens and units totalizing switches, and printing mechanism actuated under the control of said metering and totalizing switches.

10. In a measuring and recording system for measuring the values of a plurality of variable factors and recording the same in columns and rows on a record sheet, the combination of measuring means for measuring the values of said plurality of variable factors, said measuring means comprising electrically responsive means and rotary switch means for causing a measuring current to act on said electrically responsive means in effecting the measuring operation, printing mechanism comprising a rotatable type wheel responsive to said rotary switch means and adapted to make printed impressions on said record sheet, and means for shifting said type wheel back and forth across said record sheet and for advancing said record sheet so as to group the printed impressions in columns and in rows on said record sheet.

11. In a metering, totalizing and printing system, the combination of measuring means for measuring the values of a plurality of variable factors, said measuring means comprising electrically responsive means, metering means for passing a varying measuring current through said electrically responsive means in effecting the measuring operation, totalizing means responsive to said metering means for totalizing a plurality of the values established by said measuring means, printing mechanism comprising a single rotatable type wheel adapted to make printed impressions on a record sheet, and means for rotating said type wheel to different positions under the control of said metering means and under the control of said totalizing means, whereby said single type wheel serves to record both the individual values of each of said plurality of variable factors and also the totalized values of a group of said variable factors in predetermined juxtaposed relation on the same record sheet.

12. In an automatic system for metering, totalizing and printing the instantaneous current values in a plurality of load circuits, the combination of measuring means comprising a load coil and electrically responsive balancing means acting in opposition thereto, means for causing said load coil to respond to said current values, metering means for automatically passing varying current values through said balancing means until a balance is obtained, totalizing switches of different denominations responsive to said metering means, means for causing a carry-over operation from the totalizing switch of lower denomination to the totalizing switch of higher denomination, and printing mechanism operative to print the totals determined by said totalizing switches.

13. In an automatic system for measuring and recording the watt loads in each of a plurality of load circuits, the combination of measuring apparatus adapted to respond to the watt loads in said circuits, said measuring apparatus comprising electrically responsive means and metering means governing the magnitude of the current flow to said electrically responsive means in the measuring operations, totalizing means for totalizing the watt loads in a group of said load circuits, and printing mechanism responsive to said measuring apparatus and to said totalizing means for recording the watt loads existing in said load circuits.

14. In an automatic system for metering, totalizing and recording the electrical values of a plurality of circuits, the combination of a plurality of balancing relays each individual to one of said circuits and arranged to be responsive thereto, each of said relays comprising a balancing coil, metering means for passing a balancing current through said balancing coils to determine the electrical values acting on said relays, totalizing means for totalizing a plurality of said values, and printing mechanism responsive to said metering means and said totalizing means.

15. In an automatic printing metering system for measuring and printing the substantially instantaneous values of a characteristic which is subject to continuous or irregular change, the combination of balancing relay means for measuring the characteristic, means cooperating with said balancing relay means for measuring and printing the instantaneous value of the characteristic to be measured within coarse limits, and additional means cooperating with said balancing relay means for measuring and printing a more accurate subdivision of the instantaneous value to be measured.

16. In an automatic printing metering system, the combination of recording mechanism, means for measuring the values of a characteristic to be measured, means responsive to said measuring means for causing said recording mechanism to print on a record sheet numbers which are proportional to the values of the characteristic to be measured in a plurality of devices or circuits, means operated by said measuring and printing means for adding the values so measured, and means responsive to said adding means for causing said same recording mechanism to print the total on said same record sheet.

17. In a system of the class described, the combination of a balancing relay comprising a load circuit coil, together with a tens coil and units coil acting in opposition thereto, a rotary selector switch operative to connect different load circuits to said load circuit coil, a tens rotary metering switch operative to produce a current flow in said tens coil graduated in ten ampere steps, a units rotary metering switch operative to produce a current flow in said units coil graduated in one ampere steps, a main sequence switch governing said rotary selector switch and said metering switches, a tens rotary totalizing switch responsive to said tens rotary metering switch, a units rotary totalizing switch responsive to said units rotary metering switch, a totalizing sequence switch governing said tens and units totalizing switches, printing mechanism comprising a rotary type wheel shiftable to different positions across a record sheet, and means responsive to said metering switches and to said totalizing switches for controlling said printing wheel.

18. In an automatic metering system of the class described, the combination of means for measuring the individual numerical values of a plurality of variable characteristics, totalizing means for accumulating the individual numerical values of each of said variable characteristics, and printing means connected to both said measuring means and said totalizing means and comprising type means operative to print said individual numerical values in one place on a record sheet and the totalized numerical values in another place on said same record sheet.

19. In an automatic printing metering system of the class described, the combination of measuring means for measuring the individual electrical values in each of a plurality of circuits, time responsive means governing the operation of said measuring means, totalizing means for totalizing the electrical values in different groups of said circuits, said totalizing means comprising totalizing apparatus adapted to be actuated in response to the individual electrical values in said groups, and printing means connected to both said measuring means and said totalizing means and comprising type means operative to first print said individual electrical values in one place on a record sheet and to thereafter print said totalized electrical values in another place on said same record sheet.

20. In an automatic printing metering system of the class described, the combination of measuring means for measuring the individual electrical values in each of a plurality of circuits, time responsive means governing the operation of said measuring means, totalizing means for totalizing the electrical values in a group of said circuits, said totalizing means comprising a totalizing device adapted to be advanced with a step-by-step motion in response to the individual electrical values in said group of circuits, and printing means connected to both said measuring means and said totalizing means and comprising a rotary type wheel operative to first print a group of said individual electrical values in columns on a record sheet, and to thereafter print the totalized electrical value of said group in another column on said record sheet.

21. In an automatic system for measuring and recording the individual instantaneous watt loads in each of a plurality of individual load circuits and the total of the individual instantaneous watt loads in a group of said load circuits, the combination of measuring apparatus adapted to respond to the instantaneous watt loads in said circuits, said measuring apparatus comprising electrically responsive means and metering means governing the magnitude of the current flow to said electrically responsive means in the measuring operations, totalizing means for totalizing the numerical values which are a measure of the instantaneous watt loads in a group of said load circuits, and printing mechanism responsive to said measuring apparatus and to said totalizing means for recording the individual instantaneous watt loads existing in said individual load circuits and for recording the total watt load in a group of said load circuits.

TITUS G. LE CLAIR.